US010590343B2
:::

(12) United States Patent
Lamaka et al.

(10) Patent No.: US 10,590,343 B2
(45) Date of Patent: Mar. 17, 2020

(54) CORROSION INHIBITOR COMPOSITION FOR MAGNESIUM OR MAGNESIUM ALLOYS

(71) Applicant: Helmholtz-Zentrum Geesthacht Zentrum für Material-und Küstenforschung GmbH, Geesthacht (DE)

(72) Inventors: Sviatlana Lamaka, Geesthacht (DE); Daniel Höche, Wentorf Bei Hamburg (DE); Mikhail L. Zheludkevich, Geesthacht (DE)

(73) Assignee: Helmholtz-Zentrum Geesthacht Zentrum für Material-und Küstenforschung GmbH, Geesthacht (DE)

( * ) Notice: Subject to any disclaimer, the term of this patent is extended or adjusted under 35 U.S.C. 154(b) by 119 days.

(21) Appl. No.: 15/664,953

(22) Filed: Jul. 31, 2017

(65) Prior Publication Data

US 2018/0044590 A1    Feb. 15, 2018

(30) Foreign Application Priority Data

Aug. 15, 2016  (EP) .................................. 16184196

(51) Int. Cl.
| | |
|---|---|
| *C09K 15/30* | (2006.01) |
| *C23F 11/04* | (2006.01) |
| *C09D 5/08* | (2006.01) |
| *C23F 11/12* | (2006.01) |
| *C23F 11/14* | (2006.01) |
| *C23C 22/57* | (2006.01) |
| *C09D 7/63* | (2018.01) |

(52) U.S. Cl.
CPC ............ *C09K 15/30* (2013.01); *C09D 5/086* (2013.01); *C09D 7/63* (2018.01); *C23C 22/57* (2013.01); *C23F 11/04* (2013.01); *C23F 11/124* (2013.01); *C23F 11/128* (2013.01); *C23F 11/144* (2013.01); *C23F 11/145* (2013.01); *C23F 11/149* (2013.01)

(58) Field of Classification Search
None
See application file for complete search history.

(56) References Cited

U.S. PATENT DOCUMENTS

| | | | |
|---|---|---|---|
| 4,482,439 A | 11/1984 | Toomey, Jr. | |
| 5,089,349 A | 2/1992 | Kaiser | |
| 5,122,608 A * | 6/1992 | Strong | C07D 215/54 546/168 |
| 5,206,368 A * | 4/1993 | Yager | C07D 213/80 546/168 |
| 5,250,694 A * | 10/1993 | Miller | C07D 213/79 546/168 |
| 5,288,866 A * | 2/1994 | Strong | C07D 213/80 544/215 |
| 5,378,843 A * | 1/1995 | Strong | C07D 213/80 544/215 |
| 5,545,835 A * | 8/1996 | Strong | C07D 213/80 544/215 |
| 5,767,308 A | 6/1998 | Thiele et al. | |
| 6,569,264 B1 | 5/2003 | Fukumura et al. | |
| 2018/0320271 A1 * | 11/2018 | Lamaka | C09D 5/086 |

FOREIGN PATENT DOCUMENTS

| | | |
|---|---|---|
| EP | 0023371 A1 | 2/1981 |
| EP | 1683894 A1 | 7/2006 |
| EP | 2075824 A1 | 7/2009 |
| JP | S58194136 A | 11/1983 |

OTHER PUBLICATIONS

European Extended Search Report in related European Application No. 16184196.0, dated Mar. 6, 2017.

\* cited by examiner

*Primary Examiner* — Joseph D Anthony
(74) *Attorney, Agent, or Firm* — Marshall, Gerstein & Borun LLP

(57) ABSTRACT

The present invention relates to novel corrosion inhibitor compositions for magnesium or magnesium alloys and to a process for inhibiting the corrosion of such metals using such compositions. The corrosion inhibitor composition for magnesium or magnesium alloys comprises at least one corrosion inhibiting compound which is capable of forming a complex with at least one of Fe(II), Fe(III), Cu(I), Cu(II) and Ni(II) ions, where the complex with at least one of Fe(II), Fe(III), Cu(I), Cu(II) and Ni(II) ions has a stability constant in aqueous solution at room temperature (about 21° C.) log K of greater than or equal to 3.5 wherein the corrosion inhibiting compound is selected from the group of pyridinedicarboxylic acids, and their salts or esters thereof.

12 Claims, 8 Drawing Sheets

CORROSION INHIBITOR COMPOSITION FOR MAGNESIUM OR MAGNESIUM ALLOYS

CROSS REFERENCE TO RELATED APPLICATIONS

The benefit of priority to European Patent Application No. 16184196.0 filed Aug. 15, 2016, is hereby claimed and the disclosure is incorporated herein by reference in its entirety.

BACKGROUND

Field of the Invention

The present invention relates to novel corrosion inhibitor compositions for magnesium or magnesium alloys and to a process for inhibiting the corrosion of such metals using such compositions.

Brief Description of Related Technology

Magnesium is most lightweight of all structural metals, weighing 35 percent less than aluminum and 78 percent less than steel. Lightweight characteristics, wide availability and processability make magnesium alloys suitable for production of motor vehicle components, electric products, aircraft components, etc. Generally, magnesium and magnesium alloys are formed into shaped articles by die casting, extrusion or rolling. However, the percentage of magnesium alloys used in automobiles, electric products, aircraft components, etc. has been traditionally low. The reasons for the limited use of magnesium alloys are associated with the intrinsic properties of this family of alloys: low creep and corrosion resistance.

The corrosion resistance of magnesium or magnesium alloys depends on similar factors that are critical to other metals. However, because of the electrochemical activity of magnesium, the relative importance of some factors is greatly amplified. When unalloyed magnesium is exposed to air at room temperature, a gray oxide forms on its surface. Moisture converts this oxide to magnesium hydroxide, which is stable in the basic range of pH values, but not in the neutral or acid ranges.

For providing anti-corrosion properties, magnesium or magnesium alloys are generally treated with chromates. The chromate treatment nevertheless involves the difficulty in setting the conditions for the treatment, so that it has been desired to provide more convenient corrosion inhibiting processes. Furthermore, the chromate treatment has the drawback that when conducted, the treatment discolors the surface of the metal, depriving the metal of its luster. Furthermore, chromium compounds are rather toxic and harmful to the environment. Thus, processes are highly desirable which are less likely to burden the environment.

For achieving corrosion protection, magnesium can also be coated in an assortment of ways depending on the type of alloy used, the desired qualities of the finished material and the application in which it will be used. For example, magnesium can be coated with organic layers. These layers prevent against corrosion of the magnesium by insulating it from the outside environment.

Advanced coating systems also possess active corrosion protection that implies continuous corrosion protection, even in the event of local damage to the coating. This is achieved by incorporating corrosion inhibitors in various components of multilayer coating system: in conversion coating, pre-treatment or even in the top coat.

For many years, chromates have been used as the most effective corrosion inhibitors for multiple metals and alloys including magnesium and its alloys. However, the use of chromates will have to come to the end by 2017 due to EU regulations. Thus, new corrosion inhibitors are needed for replacing the chromates without compromising their high efficiency. Nowadays, chromium-free inhibitor solutions do not provide equivalent inhibiting efficiency.

U.S. Pat. No. 6,569,264 B1 discloses a corrosion inhibitor composition for magnesium or magnesium alloys for use in protective coatings, which contains as an effective component, a phosphate, at least one compound selected from among aromatic carboxylic acids (e.g. toluic acid) or salts thereof and a pyrazole or triazole (such as 1,2,3-triazoles or 1,2,4-triazoles). Published European patent application 1 683 894 A1 discloses the use of 1,2,4-triazoles or pyrazole compounds (e.g. 3,5-dimethylpyrazole) as useful corrosion inhibitors for magnesium and magnesium alloys, which could be incorporated in protective coatings.

Co-pending European patent application 15189674.3 discloses that noble impurities like, iron, copper and nickel, although being the sites of cathodic reaction, get detached from the corroding magnesium by undermining mechanisms and dissolve by forming $Fe(II)$, $Fe(III)$, $Cu(I)$, $Cu(II)$ and $Ni(II)$ ions. This enlarges the area of cathodic activity and accelerates corrosion. Subsequently, these ions are being reduced and re-deposit on the surface of the magnesium or magnesium alloy. Corrosion inhibitors for magnesium or magnesium alloys that prevent re-deposition of the ions are preferably selected from salicylic acid and their derivatives, acid and salts thereof.

However, there is still the need to provide corrosion inhibitors for use in coatings for magnesium or magnesium alloys which have a still improved effectiveness for a wide range of magnesium alloys.

SUMMARY OF THE INVENTION

It is therefore an object of the present invention to provide novel corrosion inhibitor compositions for magnesium or magnesium alloys useful in coatings which are more effective and of lesser environmental concern than known corrosion inhibitor compositions and to a process for inhibiting the corrosion of such metals using such compositions.

Surprisingly, this object is achieved by a corrosion inhibitor composition for magnesium or magnesium alloys comprising at least one corrosion inhibiting compound which is selected from the group of pyridine-dicarboxylic acids, their salts, esters or amides, and pyridine-dicarboxaldehyde dioximes.

Preferably, the corrosion inhibiting compound is capable of forming a complex with at least one of $Fe(II)$, $Fe(III)$, $Cu(I)$, $Cu(II)$ and $Ni(II)$ ions, where the complex with at least one of $Fe(II)$, $Fe(III)$, $Cu(I)$, $Cu(II)$ and $Ni(II)$ ions has a stability constant in aqueous solution at room temperature (about 21° C.) log K of greater than or equal to 3.5.

DETAILED DESCRIPTION

Figure 1:
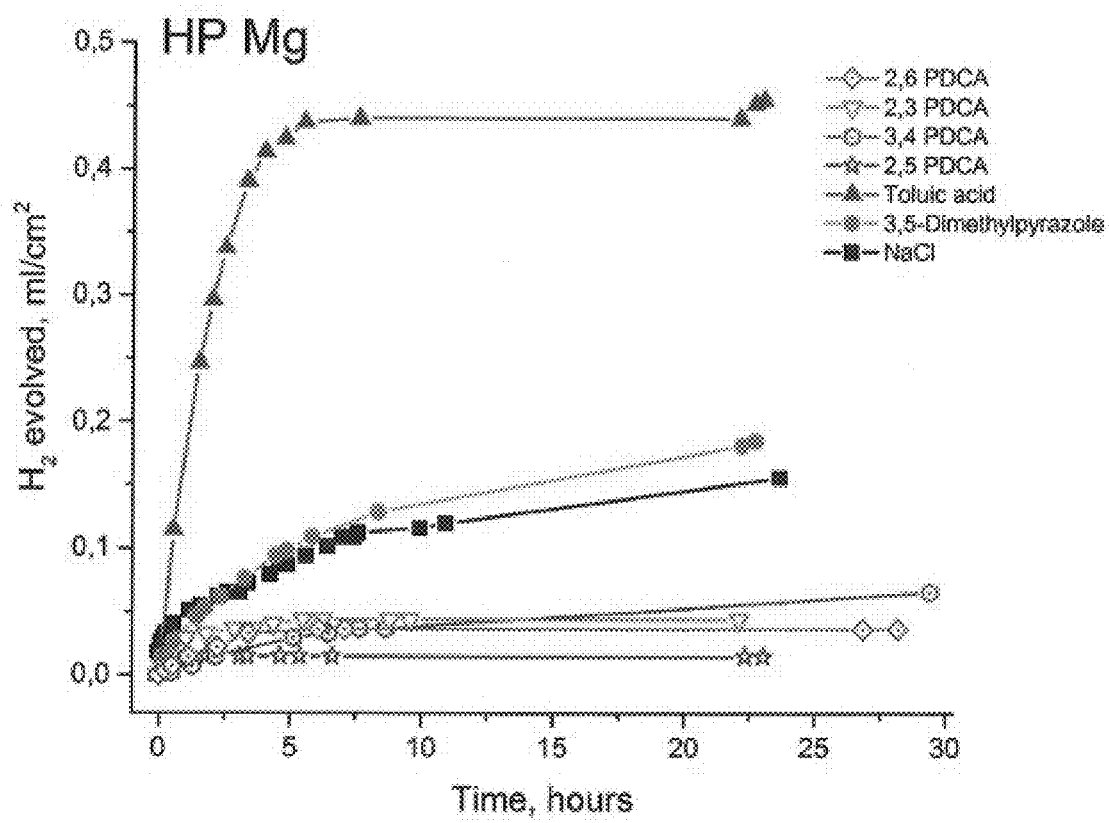
FIG. 1 shows the results (normalized values) of hydrogen evolution measurements during immersion of HP Mg (high purity Mg containing Fe—51 ppm)

The term "stability constant", K, refers herein above and in the claims section to the equilibrium constant for the equilibrium that exists between a metal ion surrounded by water molecule ligands and the same transition metal ion surrounded by a ligand or ligands of another kind in a ligand displacement reaction for the overall displacement reaction.

The term "room temperature" refers herein above and in the claims section to the temperature as defined in "The American Heritage Dictionary of the English Language", which identifies room temperature as around 20° C. to 22° C. (68° F. to 72° F.).

The present inventors found that surprisingly noble impurities like iron, copper and nickel get detached from the magnesium metal by undermining mechanisms and dissolve by forming Fe(II), Fe(III), Cu(I), Cu(II) and Ni(II) ions. Subsequently, these ions are being reduced and re-deposit on the surface of the anode, which accelerates corrosion. Thus, based on this finding, it has been found that prevention of re-deposition of noble impurities significantly decreases the corrosion rate of the metal. Re-deposition of dissolved nickel, copper, and especially iron is effectively avoided by chemically binding said ions by means of complexing agents among which pyridinedicarboxylic acids were found to be excellent ligands for metal ions including iron, copper and nickel.

The pyridinedicarboxylic acids or their salts, esters or amides may be unsubstituted or substituted at the pyridine ring with one or more alkyl groups, such as methyl, ethyl, propyl, butyl, pentyl and/or hexyl groups; alkoxy groups, such as methoxy, ethoxy, propoxy, butoxy, pentoxy and/or hexoxy groups; halogen groups, such as chloro, bromo and/or iodo groups; cyano groups; amino groups; and/or hydroxyl groups or the like.

Suitable pyridinedicarboxylic acids or their salts, esters and/or amides are preferably selected from the group consisting of 2,6-pyridinedicarboxylic acid, 2,5-pyridinedicarboxylic acid, 2,4-pyridinedicarboxylic acid, 2,3-pyridinedicarboxylic acid, 3,5-pyridinedicarboxylic acid, 3,4-pyridinedicarboxylic acid, and their salts, esters and/or amides. The afore-mentioned pyridinedicarboxylic acids, their salts, esters and/or amides may be unsubstituted or substituted with alkyl, e.g. methyl, ethyl, propyl, butyl, pentyl and/or hexyl; alkoxy, e.g. methoxy, ethoxy, propoxy, butoxy, pentoxy and/or hexoxy; halogen, e.g. chloro, bromo and/or iodo; cyano; amino; and/or hydroxyl.

Suitable substituted pyridinedicarboxylic acids or their salts, esters and/or amides include 2-amino-3,5-pyridinedicarboxylic acid, 2-hydroxy-3,5-pyridinedicarboxylic acid, 2-chloro-3,5-pyridinedicarboxylic acid, 2-methyl-3,5-pyridine-dicarboxylic acid, 2-ethyl-3,5-pyridinedicarboxylic acid, 2-amino-3,4-pyridinedi-carboxylic acid, 2-hydroxy-3,4-pyridine-dicarboxylic acid, 2-chloro-3,4-pyridinedicarboxylic acid, 2-methyl-3,4-pyridinedicarboxylic acid, 2-ethyl-3,4-pyridine-dicarboxylic acid, 3-amino-2,5-pyridinedicarboxylic acid, 3-hydroxy-2,5-pyridinedicarboxylic acid, 3-chloro-2,5-pyridine-dicarboxylic acid 3-methyl-2,5-pyridinedicarboxylic acid, 3-ethyl-2,5-pyridinedicarboxylic acid, 3-amino-2,4-pyridine-dicarboxylic acid, 3-hydroxy-2,4-pyridinedicarboxylic acid, 3-chloro-2,4-pyridinedicarboxylic acid, 3-methyl-2,4-pyridine-dicarboxylic acid, 3-ethyl-2,4-pyridinedicarboxylic acid, 3-amino-2,6-pyridinedicarboxylic acid, 3-hydroxy-2,6-pyridine-dicarboxylic acid, 3-chloro-2,6-pyridinedicarboxylic acid, 3-methyl-2,6-pyridinedicarboxylic acid, 3-ethyl-2,6-pyridine-dicarboxylic acid, 4-amino-2,6-pyridinedicarboxylic acid, 4-hydroxy-2,6-pyridinedicarboxylic acid, 4-chloro-2,6-pyridine-dicarboxylic acid 4-methyl-2,6-pyridinedicarboxylic acid, 4-ethyl-2,6-pyridinedicarboxylic acid, 4-amino-2,5-pyridine-dicarboxylic acid, 4-hydroxy-2,5-pyridinedicarboxylic acid, 4-chloro-2,5-pyridinedicarboxylic acid, 4-methyl-2,5-pyridine-dicarboxylic acid, 4-ethyl-2,5-pyridinedicarboxylic acid, 4-amino-2,3-pyridinedicarboxylic acid, 4-hydroxy-2,3-pyridine-dicarboxylic acid, 4-chloro-2,3-pyridinedicarboxylic acid, 4-methyl-2,3-pyridinedicarboxylic acid, 4-ethyl-2,3-pyridine-dicarboxylic acid, 5-amino-2,3-pyridinedi-carboxylic acid, 5-hydroxy-2,3-pyridinedicarboxylic acid, 5-chloro-2,3-pyridine-dicarboxylic acid, 5-methyl-2,3-pyridinedicarboxylic acid, 5-ethyl-2,3-pyridinedicarboxylic acid, 5-amino-2,4-pyridinedi-carboxylic acid, 5-hydroxy-2,4-pyridinedicarboxylic acid, 5-chloro-2,4-pyridinedicarboxylic acid, 5-methyl-2,4-pyridine-dicarboxylic acid, 5-ethyl-2,4-pyridinedicarboxylic acid, 5-amino-2,6-pyridinedicarboxylic acid, 5-hydroxy-2,6-pyridine-dicarboxylic acid, 5-chloro-2,6-pyridinedicarboxylic acid, 5-methyl-2,6-pyridinedicarboxylic acid, 5-ethyl-2,6-pyridine-dicarboxylic acid as well as their salts, esters and/or amides.

Most preferred pyridinedicarboxylic acids are selected from 2,6-pyridinedicarboxylic acid, 2,5-pyridinedicarboxylic acid, 2,4-pyridinedicarboxylic acid, 2,3-pyridinedicarboxylic acid, 3,5-pyridinedicarboxylic acid, 3,4-pyridinedicarboxylic acid, their salts, esters and/or amides.

Suitable salts include alkali salts such as lithium, sodium or potassium salts; alkaline earth salts, such as calcium or magnesium salts; and ammonium salts. Suitable esters include alkyl esters, such as methyl, ethyl, propyl, butyl, or pentyl esters.

The pyridine-dicarboxaldehyde dioximes may be unsubstituted or substituted at the pyridine ring with one or more alkyl groups, such as methyl, ethyl, propyl, butyl, pentyl and/or hexyl groups; alkoxy groups, such as methoxy, ethoxy, propoxy, butoxy, pentoxy and/or hexoxy groups; halogen groups, such as chloro, bromo and/or iodo groups; cyano groups; amino groups; and/or hydroxyl groups or the like.

Suitable pyridine-dicarboxaldehyde dioximes include pyridine-dicarboxaldehyde-2,6-dioxime, dicarboxaldehyde-2,5-dioxime, dicarboxaldehyde-2,4-dioxime, dicarboxaldehyde-2,3-dioxime, dicarboxaldehyde-3,5-dioxime and dicarboxaldehyde-3,4-dioxime. The afore-mentioned pyridine-dicarboxaldehyde dioximes may be unsubstituted or substituted with alkyl, e.g. methyl, ethyl, propyl, butyl, pentyl and/or hexyl; alkoxy, e.g. methoxy, ethoxy, propoxy, butoxy, pentoxy and/or hexoxy; halogen, e.g. chloro, bromo and/or iodo; cyano; amino; and/or hydroxyl.

In an embodiment of the present invention the corrosion inhibitor composition according to the present invention is present in a coating on the magnesium metal or magnesium metal alloy. Preferably the corrosion inhibiting compounds are present in cavities of porous nano- or microparticles distributed within the coating or in micro- and nano-pores produced on the surface of magnesium or magnesium alloys.

The magnesium metal or magnesium alloy is not restricted to a specific species. The corrosion inhibitors according to the present invention can be used with a large variety of different magnesium metals and alloys, e.g. high purity magnesium, (HP Mg), magnesium of commercial purity (CP Mg), magnesium alloys such as WE43, ZE41, Elektron 21, AZ31, AZ91 or AM50.

EXAMPLES

Preferred embodiments of the present invention are further illustrated by the following, non-limiting examples by referring to the figures below. Magnesium materials used for hydrogen evolution measurements presented in FIGS. 1 to 8 were as specified in Table 1. The ingots of HP Mg51, WE43, ZE41, E21, AZ31, AZ91 and AM50 were shaved to receive the stripes with the surface area of 180 to 550 $cm^2/g$. This was done to ensure the identical chemical composition of each portion of the alloy used for testing solutions of different inhibitors. The plates (5.0 $cm^2/g$) of commercial purity magnesium (CP Mg220) were tested.

TABLE 1

Noble impurities found* in the materials used for hydrogen evolution tests.

| | Impurity, ppm | | |
|---|---|---|---|
| Material | Fe | Cu | Ni |
| High Purity Mg (HP Mg 51) | 51 | <1 | <2 |
| Commercial Purity Mg (CP Mg 220) | 220 | 5 | <2 |
| WE43 | 38 | 47 | 46 |
| ZE41 | 15 | 19 | 6 |
| Elektron 21 (E21) | 12 | 20 | 52 |
| AZ31 | 18 | 14 | 3 |
| AZ91 | 22 | 48 | <2 |
| AM50 | 9 | 13 | 3 |

*Analysed by spark emission spectroscopy

Table 1: Noble impurities found* in the materials used for hydrogen evolution tests.

FIG. 1 shows the results (normalized values) of hydrogen evolution measurements during immersion of HP Mg (high purity Mg containing Fe—51 ppm) in 0.5% NaCl containing 0.05 M of 2,3-pyridinedicarboxylic acid sodium salt marked as 2,3 PDCA, 0.05M of 2,5-pyridinedicarboxylic acid sodium salt marked as 2,5 PDCA, 0.03M of 2,6-pyridinedicarboxylic acid sodium salt marked as 2,6 PDCA, 0.038M of 3,4-pyridinedicarboylic acid sodium salt marked as 3,4 PDCA, 0.05M of 3,5-dimethylpyrazole (comparative), 0.05M of toluic acid sodium salt (comparative) and pure 0.5% NaCl (comparative); pH of resulting solutions of sodium salts (adjusted by NaOH) was in the range of 6.3 to 7.3.

Figure 2:
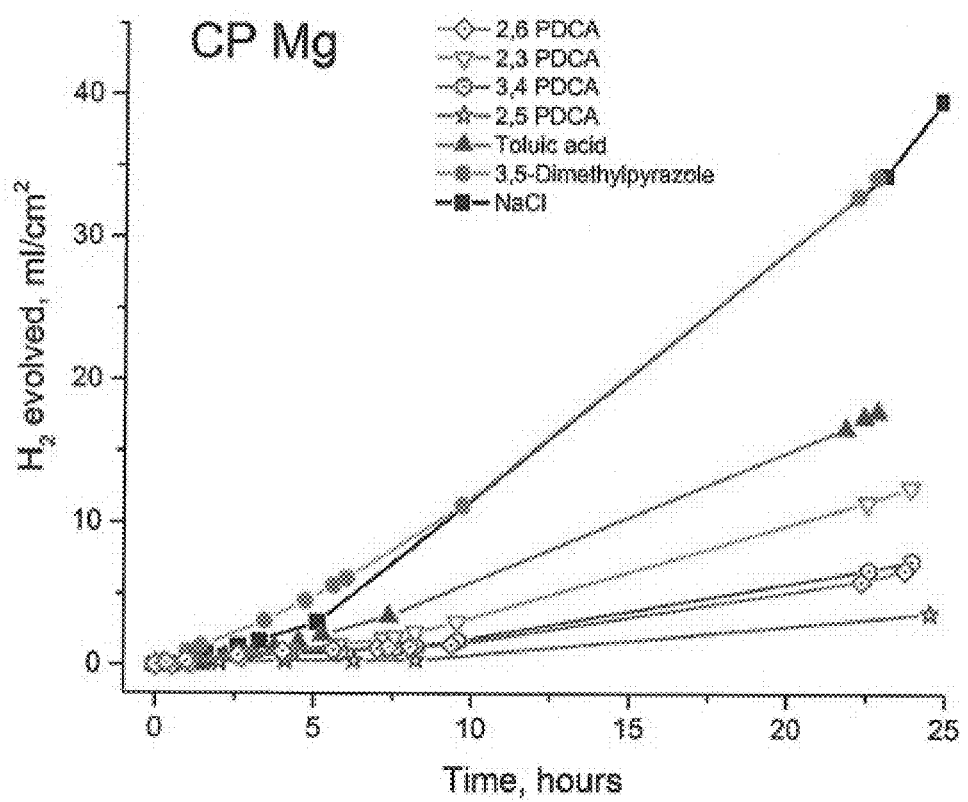
FIG. 2 shows the results (normalized values) of hydrogen evolution measurements during immersion of CP Mg (commercial purity Mg containing Fe—220 ppm)

FIG. 2 shows the results (normalized values) of hydrogen evolution measurements during immersion of CP Mg (commercial purity Mg containing Fe—220 ppm) in 0.5% NaCl containing 0.05 M of 2,3-pyridinedicarboxylic acid sodium salt, 0.05M of 2,5-pyridinedicarboxylic acid sodium salt, 0.03M of 2,6-pyridinedicarboxylic acid sodium salt, 0.038M of 3,4-pyridinedicarboxylic acid sodium salt, 0.05M of 3,5-dimethylpyrazole (comparative), 0.05M of toluic acid sodium salt (comparative) and pure 0.5% NaCl (comparative); pH of resulting solutions of sodium salts (adjusted by NaOH) was in the range of 6.3 to 7.3.

Figure 3:
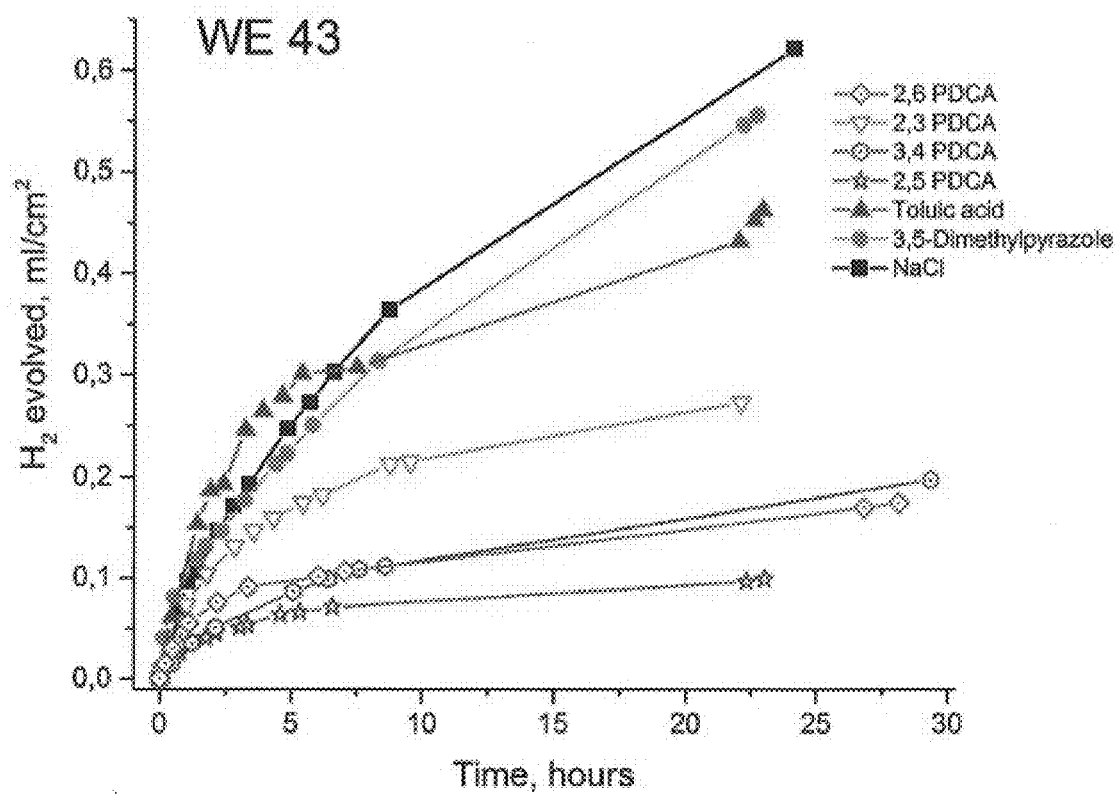
FIG. 3 shows the results (normalized values) of hydrogen evolution measurements during immersion of WE43 magnesium alloy.

FIG. 3 shows the results (normalized values) of hydrogen evolution measurements during immersion of WE43 magnesium alloy in 0.5% NaCl containing 0.05 M of 2,3-pyridinedicarboxylic acid sodium salt, 0.05M of 2,5-pyridinedicarboxylic acid sodium salt, 0.03M of 2,6-pyridinedicarboxylic acid sodium salt, 0.038M of 3,4-pyridinedicarboxylic acid sodium salt, 0.05M of 3,5-dimethylpyrazole (comparative), 0.05M of toluic acid sodium salt (comparative) and pure 0.5% NaCl (comparative); pH of resulting solutions of sodium salts (adjusted by NaOH) was in the range of 6.3 to 7.3.

Figure 4:
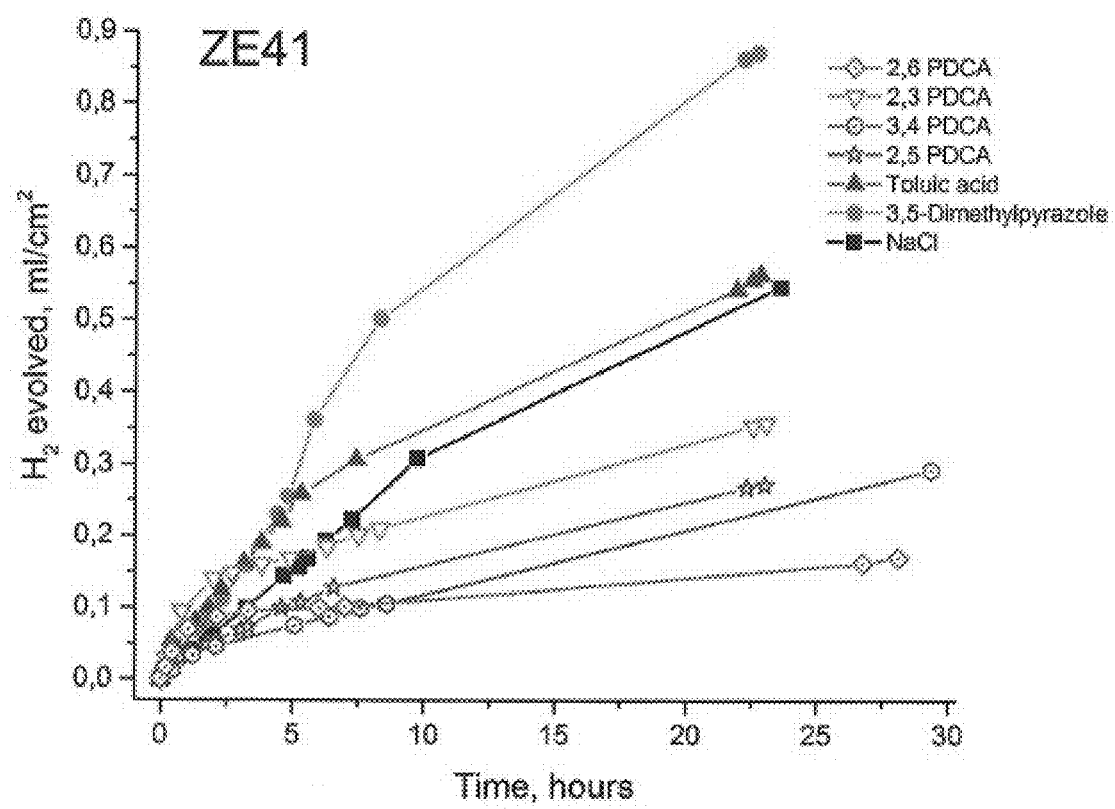
FIG. 4 shows the results (normalized values) of hydrogen evolution measurements during immersion of ZE41 magnesium.

FIG. 4 shows the results (normalized values) of hydrogen evolution measurements during immersion of ZE41 magnesium alloy in 0.5% NaCl containing 0.05 M of 2,3-pyridinedicarboxylic acid sodium salt, 0.05M of 2,5-pyridinedicarboxylic acid sodium salt, 0.03M of 2,6-pyridinedicarboxylic acid sodium salt, 0.038M of 3,4-pyridinedicarboxylic acid sodium salt, 0.05M of 3,5-dimethylpyrazole (comparative), 0.05M of toluic acid sodium salt (comparative) and pure 0.5% NaCl (comparative); pH of resulting solutions of sodium salts (adjusted by NaOH) was in the range of 6.3 to 7.3.

Figure 5:
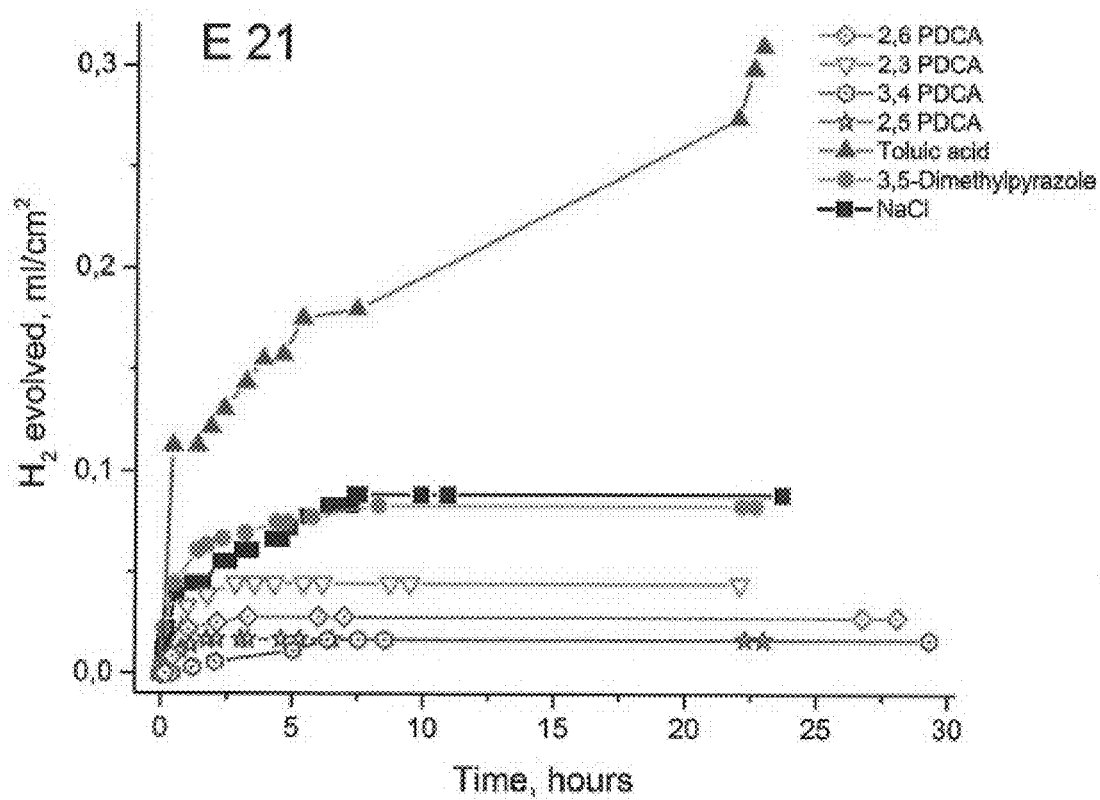
FIG. 5 shows the results (normalized values) of hydrogen evolution measurements during immersion of Elektron 21 (E21) magnesium alloy.

FIG. 5 shows the results (normalized values) of hydrogen evolution measurements during immersion of Elektron 21 (E21) magnesium alloy in 0.5% NaCl containing 0.05 M of 2,3-pyridinedicarboxylic acid sodium salt, 0.05M of 2,5-pyridinedicarboxylic acid sodium salt, 0.03M of 2,6-pyridinedicarboxylic acid sodium salt, 0.038M of 3,4-pyridinedicarboxylic acid sodium salt, 0.05M of 3,5-dimethylpyrazole (comparative), 0.05M of toluic acid sodium salt (comparative) and pure 0.5% NaCl (comparative); pH of resulting solutions of sodium salts (adjusted by NaOH) was in the range of 6.3 to 7.3.

Figure 6:
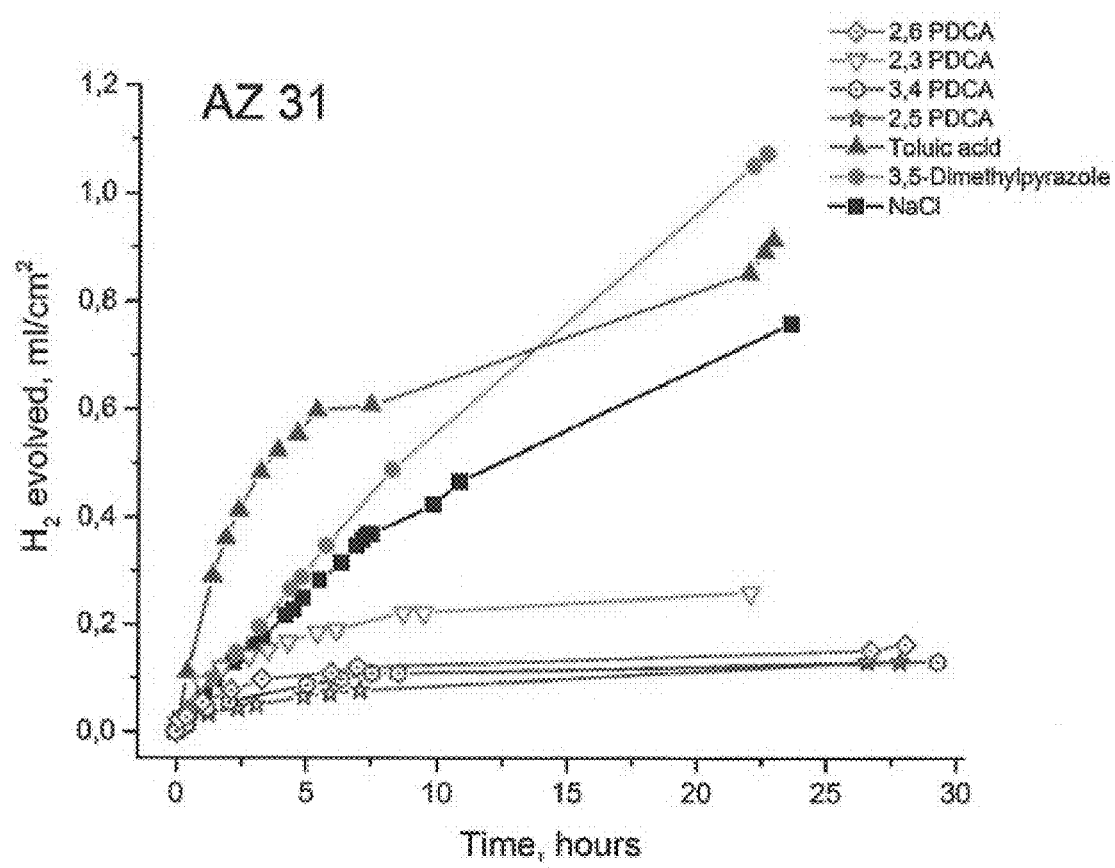
FIG. 6 shows the results (normalized values) of hydrogen evolution measurements during immersion of AZ31 magnesium alloy.

FIG. 6 shows the results (normalized values) of hydrogen evolution measurements during immersion of AZ31 magnesium alloy in 0.5% NaCl containing 0.05 M of 2,3-pyridinedicarboxylic acid sodium salt, 0.05M of 2,5-pyridinedicarboxylic acid sodium salt, 0.03M of 2,6-pyridinedicarboxylic acid sodium salt, 0.038M of 3,4-pyridinedicarboxylic acid sodium salt, 0.05M of 3,5-dimethylpyrazole (comparative), 0.05M of toluic acid sodium salt (comparative) and pure 0.5% NaCl (comparative); pH of resulting solutions of sodium salts (adjusted by NaOH) was in the range of 6.3 to 7.3.

Figure 7:
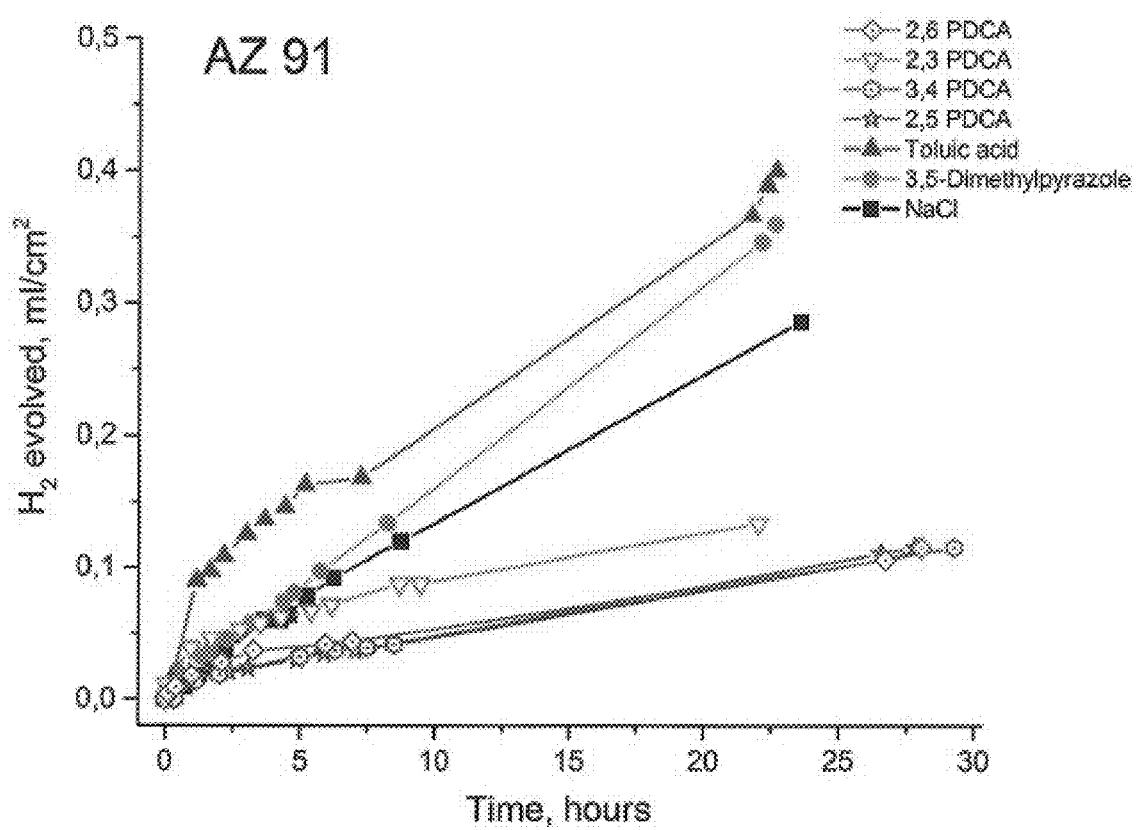
FIG. 7 shows the results (normalized values) of hydrogen evolution measurements during immersion of AZ91 magnesium alloy.

FIG. 7 shows the results (normalized values) of hydrogen evolution measurements during immersion of AZ91 magnesium alloy in 0.5% NaCl containing 0.05 M of 2,3-pyridinedicarboxylic acid sodium salt, 0.05M of 2,5-pyridinedicarboxylic acid sodium salt, 0.03M of 2,6-pyridinedicarboxylic acid sodium salt, 0.038M of 3,4-pyridinedicarboxylic acid sodium salt, 0.05M of 3,5-dimethylpyrazole (comparative), 0.05M of toluic acid sodium salt (comparative) and pure 0.5% NaCl (comparative); pH of resulting solutions of sodium salts (adjusted by NaOH) was in the range of 6.3 to 7.3.

Figure 8:
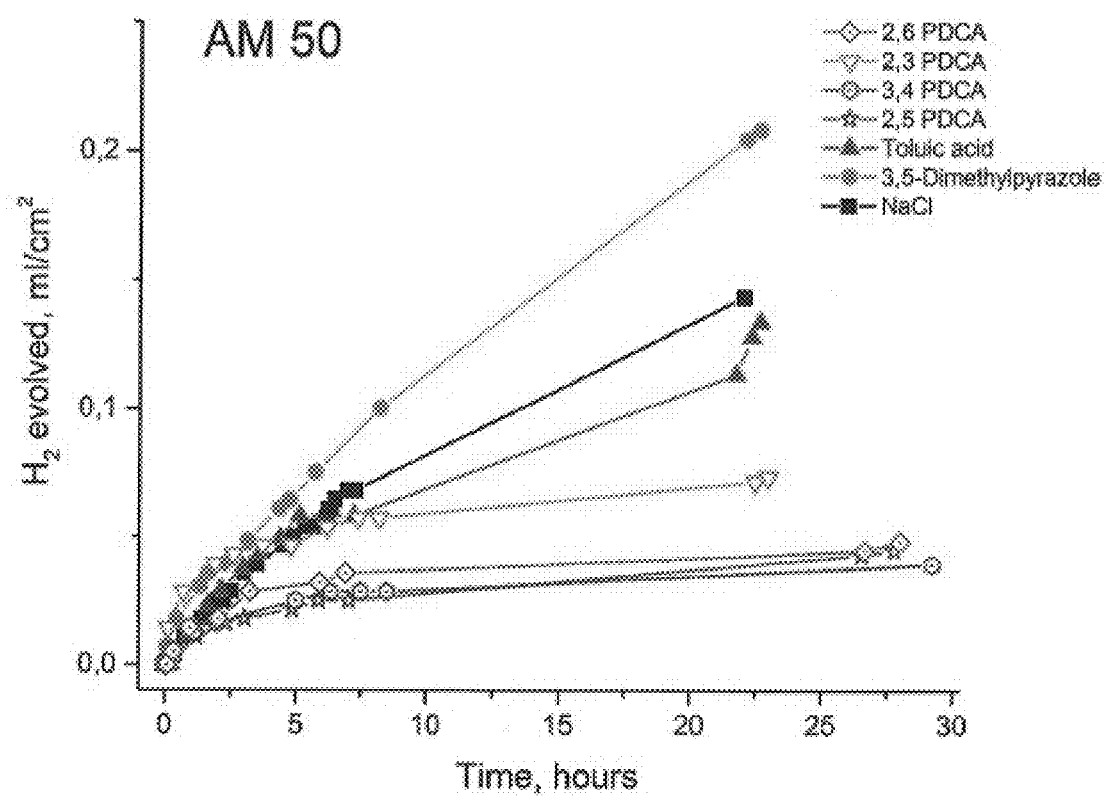
FIG. 8 shows the results (normalized values) of hydrogen evolution measurements during immersion of AM50 magnesium alloy.

FIG. 8 shows the results (normalized values) of hydrogen evolution measurements during immersion of AM50 magnesium alloy in 0.5% NaCl containing 0.05 M of 2,3-pyridinedicarboxylic acid sodium salt, 0.05M of 2,5-pyridinedicarboxylic acid sodium salt, 0.03M of 2,6-pyridinedicarboxylic acid sodium salt, 0.038M of 3,4-pyridinedicarboxylic acid sodium salt, 0.05M of 3,5- dimethylpyrazole (comparative), 0.05M of toluic acid sodium salt (comparative) and pure 0.5% NaCl (comparative); pH of resulting solutions of sodium salts (adjusted by NaOH) was in the range of 6.3 to 7.3.

In the examples shown in FIGS. 1 to 8 it is shown that the corrosion inhibiting compounds according to the present invention efficiently protect the magnesium and magnesium alloys from corrosion and show significantly improved corrosion inhibiting efficiencies compared to toluic acid and 3,5-dimethylpyrazole as known from U.S. Pat. No. 6,569, 264 B1, US 2007/080319 A1, and EP 1 683 894 A1.

As can also be seen in FIGS. 1 to 8, the corrosion inhibiting compounds according to the present invention show a corrosion inhibiting efficiency of more than 30% (in most of the cases, inhibiting efficiency is higher than 60%) that is at least 25% better than toluic acid and at least 45% better than 3,5-dimethylpyrazole known from the prior art.

The values of the inhibiting efficiency (IE) were calculated using the following equation:

$$IE = \frac{V_{H_2}^0 - V_{H_2}^{Inh}}{V_{H_2}^0} * 100\%$$

where $V_{H_2}^0$ and $V_{H_2}^{Inh}$ are the amounts of $H_2$ (ml) evolved at 20 hours of immersion in pure NaCl solution and in NaCl solution containing one of the corrosion inhibitors.

TABLE 2

Inhibiting efficiency of sodium salts of pyridinedicarboxylic acids and comparative inhibitors known from previous state of the art.

| Inhibitor | Pure magnesium or alloy | | | | | | | |
|---|---|---|---|---|---|---|---|---|
| | CP Mg | HP Mg | WE43 | ZE41 | E21 | AZ31 | AZ91 | AM50 |
| 2,3-Pyridinedicarb-oxylic acid (0.05M) | 66.1 | 70.1 | 52.4 | 32.4 | 50.1 | 62.5 | 48.7 | 48.0 |
| 2,5-Pyridinedicarb-oxylic acid (0.05M) | 90.6 | 90.1 | 83.3 | 49.1 | 81.3 | 83.5 | 65.1 | 72.1 |
| 2,6-Pyridinedicarb-oxylic acid (0.03M) | 82.2 | 75.3 | 73.4 | 70.9 | 69.0 | 79.2 | 65.4 | 68.6 |
| 3,4-Pyridinedicarb-oxylic acid (0.038M) | 80.3 | 63.9 | 71.3 | 57.2 | 81.3 | 82.2 | 66.5 | 74.0 |
| Toluic acid (0.05M) | 48.6 | −204.1 | 24.9 | −5.6 | −194.4 | −20.9 | −39.1 | 19.5 |
| 3,5-Dimethylpyrazole (0.05M) | −0.1 | −19.5 | 7.8 | −66.5 | 6.4 | −42.7 | −27.3 | −42.0 |

As it is evident from FIGS. 1 to 8, the corrosion inhibiting effect of the novel corrosion inhibiting compounds is not restricted to a specific magnesium metal or magnesium alloy, but present for a large variety of different magnesium metals and alloys, e.g. high purity magnesium, commercial impurity magnesium containing noble impurities, WE43, ZE41, Elektron 21, AZ31, AZ91 or AM50. Independently of the magnesium metal or alloy, the novel corrosion inhibiting compounds show a significantly improved corrosion inhibiting effect compared to toluic acid and 3,5-dimethylpyrazole known from the prior art.

The invention claimed is:

1. A corrosion inhibitor composition coated on a magnesium or magnesium alloy, the corrosion inhibitor composition comprising at least one corrosion inhibiting compound selected from the group of substituted or unsubstituted pyridine-dicarboxylic acids, their salts, esters or amides, and pyridine-dicarboxaldehyde dioximes, the corrosion inhibitor composition being coated on the magnesium or magnesium alloy.

2. The corrosion inhibitor composition of claim 1, wherein the unsubstituted pyridinedicarboxylic acids, their salts, esters and/or amides are selected from the group consisting of 2,6-pyridinedicarboxylic acid, 2,5-pyridinedicarboxylic acid, 2,4-pyridinedicarboxylic acid, 2,3-pyridinedi-carboxylic acid, 3,5-pyridinedicarboxylic acid, 3,4-pyridine-dicarboxylic acid, and their salts, esters and/or amides.

3. The corrosion inhibitor composition of claim 1, wherein the substituted pyridinedicarboxylic acids, their salts, esters and/or amides are selected from the group consisting of 2-amino-3,5-pyridinedicarboxylic acid, 2-hydroxy-3,5-pyridine-dicarboxylic acid, 2-chloro-3,5-pyridinedicarboxylic acid, 2-methyl-3,5-pyridinedi-carboxylic acid, 2-ethyl-3,5-pyridinedicarboxylic acid, 2-amino-3,4-pyridinedi-carboxylic acid, 2-hydroxy-3,4-pyri-dinedicarboxylic acid, 2-chloro-3,4-pyridinedicarboxylic acid, 2-methyl-3,4-pyridinedicarboxylic acid, 2-ethyl-3,4-pyridinedi-carboxylic acid, 3-amino-2,5-pyridinedi-carboxylic acid, 3-hydroxy-2,5-pyridinedicarboxylic acid, 3-chloro-2,5-pyridinedicarboxylic acid 3-methyl-2,5-pyridinedi-carboxylic acid, 3-ethyl-2,5-pyridine-dicarboxylic acid, 3-amino-2,4-pyridinedicarboxylic acid, 3-hydroxy-2,4-pyridinedicarboxylic acid, 3-chloro-2,4-pyridinedicarboxylic acid, 3-methyl-2,4-pyridinedi-carboxylic acid, 3-ethyl-2,4-pyridinedicarboxylic acid, 3-amino-2,6-pyridinedicarboxylic acid, 3-hydroxy-2,6-pyridinedi-carboxylic acid, 3-chloro-2,6-pyridinedi-carboxylic acid, 3-methyl-2,6-pyridinedicarboxylic acid, 3-ethyl-2,6-pyridinedicarboxylic acid, 4-amino-2,6-pyridine-dicarboxylic acid, 4-hydroxy-2,6-pyridinedi-carboxylic acid, 4-chloro-2,6-pyridinedicarboxylic acid 4-methyl-2,6-pyridinedicarboxylic acid, 4-ethyl-2,6-pyridinedi-carboxylic acid, 4-amino-2,5-pyridinedi-carboxylic acid, 4-hydroxy-2,5-pyridinedicarboxylic acid, 4-chloro-2,5-pyridinedicarboxylic acid, 4-methyl-2,5-pyridinedi-carboxylic acid, 4-ethyl-2,5-pyridinedicar-boxylic acid, 4-amino-2,3-pyridinedicarboxylic acid, 4-hydroxy-2,3-pyridinedicarboxylic acid, 4-chloro-2,3-pyridinedi-carboxylic acid, 4-methyl-2,3-pyridinedicar-boxylic acid, 4-ethyl-2,3-pyridinedicarboxylic acid, 5-amino-2,3-pyridinedi-carboxylic acid, 5-hydroxy-2,3-pyridinedi-carboxylic acid, 5-chloro-2,3-pyridinedicar-boxylic acid, 5-methyl-2,3-pyridinedicarboxylic acid, 5-ethyl-2,3-pyridinedicarboxylic acid, 5-amino-2,4-pyridinedi-carboxylic acid, 5-hydroxy-2,4-pyridinedi-carboxylic acid, 5-chloro-2,4-pyridinedicarboxylic acid, 5-methyl-2,4-pyri-dinedicarboxylic acid, 5-ethyl-2,4-pyridinedi-carboxylic acid, 5-amino-2,6-pyridinedi-carboxylic acid, 5-hydroxy-2, 6-pyridinedicarboxylic acid, 5-chloro-2,6-pyridinedicarboxylic acid, 5-methyl-2,6-pyridinedi-carboxylic acid, 5-ethyl-2,6-pyridinedicar-boxylic acid, and their salts esters and/or amides.

4. The corrosion inhibitor composition of claim 1, wherein the salts of the substituted or unsubstituted pyridinedicarboxylic acid are selected from their alkali metal, earth alkaline metal salts or ammonium salts.

5. The corrosion inhibitor composition of claim 1, wherein the esters of the substituted or unsubstituted pyridinedicarboxylic acid are selected from their methyl, ethyl, propyl, butyl, or pentyl esters.

6. The corrosion inhibitor composition of claim 1, wherein the pyridine-dicarboxaldehyde dioximes are selected from pyridine-dicarboxaldehyde-2,6-dioxime, dicarboxaldehyde-2,5-dioxime, dicarboxaldehyde-2,4-dioxime, dicarboxaldehyde-2,3-dioxime, dicarboxaldehyde-3,5-dioxime and dicarboxaldehyde-3,4-dioxime.

7. The corrosion inhibitor composition of claim 1 wherein the corrosion inhibiting compound is present in cavities of porous nano- or microparticles distributed within the corrosion inhibitor composition coating the magnesium or magnesium alloy.

8. The corrosion inhibitor composition of claim 1, wherein the corrosion inhibiting compound is present in micro- and nano-pores produced on the surface of the magnesium or magnesium alloy.

9. The corrosion inhibitor composition of claim 1, wherein magnesium or magnesium alloy is selected from the group consisting of high purity Mg, commercial purity Mg, WE43, ZE41, E21, AZ31, AZ91 and AM50.

10. A method for inhibiting the corrosion of magnesium or magnesium alloys comprising the steps of a) providing magnesium or a magnesium alloy and b) coating the magnesium or magnesium alloy with a corrosion inhibiting coating comprising a corrosion inhibitor composition according to claim 1.

11. The method of claim 9, further comprising a step a1) between step a) and b), wherein in step a1) the magnesium or magnesium alloy is pre-treated with a corrosion inhibitor composition according to claim 1.

12. A method of using the corrosion inhibitor composition according to claim 1 comprising coating magnesium or a magnesium alloy.

* * * * *